United States Patent
Köppler et al.

[11] Patent Number: 5,979,186
[45] Date of Patent: Nov. 9, 1999

[54] METHOD FOR THE MANUFACTURE OF SIO₂ GRANULAR MATERIAL

[75] Inventors: Rainer Köppler, Seligenstadt; Fritz-Ulrich Kreis, Gelnhausen; Klaus Arnold, Hanau, all of Germany

[73] Assignee: Heraeus Quarzglas GmbH, Hanau, Germany

[21] Appl. No.: 09/112,921

[22] Filed: Jul. 9, 1998

[30] Foreign Application Priority Data

Jul. 10, 1997 [DE] Germany .......................... 197 29 505

[51] Int. Cl.⁶ .................... C03B 9/00; C03B 8/00; C03B 19/01; C03B 19/09
[52] U.S. Cl. .................... 65/21.1; 264/5; 264/8; 501/54; 65/17.2; 65/17.3
[58] Field of Search .................... 65/17.3, 21.1, 65/21.4, 21.5, 17.2; 264/5, 8; 501/54

[56] References Cited

U.S. PATENT DOCUMENTS

| | | |
|---|---|---|
| 3,383,172 | 5/1968 | Biegler . |
| 4,042,361 | 8/1977 | Bihuniak et al. . |
| 4,126,422 | 11/1978 | Brandes . |
| 4,528,163 | 7/1985 | Albrecht . |
| 5,643,347 | 7/1997 | Werdecker et al. ............ 65/21.1 |

FOREIGN PATENT DOCUMENTS

| | | |
|---|---|---|
| 0 607 653 A1 | 7/1994 | European Pat. Off. . |
| 0 692 524 A1 | 1/1996 | European Pat. Off. . |
| 297801 | 1/1992 | United Kingdom . |

OTHER PUBLICATIONS

Derwent for DD 297 801, Jan. 23, 1992.

*Primary Examiner*—Stanley S. Silverman
*Assistant Examiner*—Jacqueline A Ruller
*Attorney, Agent, or Firm*—Whitman Breed Abbott & Morgan LLP; Andrew L. Tiajoloff

[57] ABSTRACT

A method is provided for the manufacture of SiO₂ granular material. Silicic acid is dispersed in a liquid to form a dispersion. The dispersion is stirred in a stirring tank with formation of a homogeneous liquid phase. The homogeneous liquid phase is maintained by stirring at a substantially constant rate until the granular mass develops, when the solids content of the dispersion is within the range of 65 to 80 weight percent. Moisture is gradually extracted to form a granular mass which is dried and sintered.

10 Claims, 2 Drawing Sheets

METHOD FOR THE MANUFACTURE OF SIO₂ GRANULAR MATERIAL

DETAILED DESCRIPTION

Figure 1:
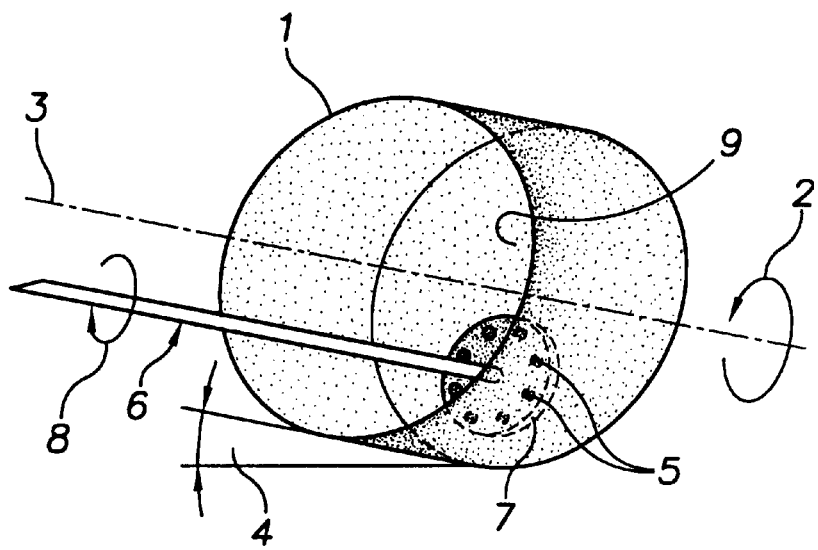

The invention relates to a method for the manufacture of SiO$_2$ granular material by means of dispersion of silicic acid in a liquid, stirring of the dispersion in a stirring tank with formation of a homogeneous liquid phase, and gradual abstraction of moisture from the dispersion by forming a granular mass, and drying of the granular mass as well as sintering.

Colloidal silicic acid is, for example, obtained by hydrolysis of silicon halogenides or silicon-organic compounds or by means of the sol-gel method. Silicic acid with a high specific surface within the range of 40 m$^2$/g and approximately 400 m$^2$/g is obtained as a by-product in large amounts, for example, by manufacturing synthetic quartz glass. However, further processing is problematic. Although such silicic acid dusts show high-purity, they are difficult to handle due to their low bulk density, and it is not possible to melt them directly to transparent almost bubble-free quartz glass bodies. For this purpose, densification of the silicic acid dusts is necessary. For this, so-called wet granulation methods are applied, where by means of continuous mixing or stirring of a colloidal dispersion of such silicic acids a sol is obtained out of which a crumbly mass is generated by means of gradual moisture abstraction.

In this patent application a colloidal dispersion is meant to be the distribution of solid silicic acid particles (SiO$_2$ particles) in a liquid, the mean size of which is within the range of 1 nm to 1000 nm. Such silicic acid particles are not only obtained by application of the above mentioned flame hydrolysis, but also by means of hydrolysis of organic silicon compounds according to the so-called sol-gel method or by means of hydrolysis of inorganic silicon compounds in a liquid. With further processing of the dispersion agglomerates with larger diameters develop due to the combination of the colloidal silicic acid particles. Due to interaction between the particles, such colloidal dispersions of silicic acid particles usually show a flow behavior referred to as structural viscosity or pseudoplasticity. At the same time, the dispersion is thixotropic. With shear strain the thixotropy shows in an apparent temporary reduction of the viscosity of the dispersion.

In a generic method according to DE-A1 44 24 044 it is proposed to treat a pyrogenetically manufactured aqueous suspension of silicic acid powder with a rotating vortexing tool in a mixing tank the circumferential velocity of which is adjusted to a value within the range of 15 m/s to 30 m/s in a first mixed phase, and to a value of 30 m/s and more in a second mixed phase. In the first mixed phase the solids content of the suspension amounts to at least 75 weight percent out of which, after the first mixed phase, a granular mass with a mean granule diameter of less than 4 mm develops. The degree of densification of the granular mass is further increased by adding amorphous silicic acid dust and by comminution of the granular mass in a second mixed phase by means of intensive mixing and impact load. Simultaneously, water penetrates from the surface of the granular mass that is powdered up by addition of silicic acid powder in order to avoid agglutination of the granulation.

The known method leads to a SiO$_2$ granular mass with flowability and high bulk density, but with unregular morphology of the granulation, containing bubbles before sintering having a broad and inhomogeneous distribution of bubble sizes. It has proven that such a granular material is not unlimitedly suitable for the manufacture of transparent quartz glass products.

Therefore, this invention is based on the problem to provide for a method to manufacture homogeneous and compact granular material with high-purity which essentially consists of spherical particles of uniform morphology.

This problem is solved according to the invention by a method in that the homogeneous liquid phase is maintained by continuous stirring just as long until the granular mass develops from it, when the solids content of the dispersion is within the range of 65 weight percent to 80 weight percent.

With the method according to the invention the structural viscosity and thixotropy features of the dispersion are used for specific adjustment of the residual moisture during disintegration of the dispersion into the granular mass. For this purpose, the homogeneous liquid phase is maintained by means of continuous stirring until the solids content is within the range of 65 weight percent to 80 weight percent. By means of a more powerful stirring motion the liquid phase could be kept longer, and with a slower stirring motion the liquid phase could be transformed quicker into the granular mass. However, the one as well as the other method would involve disadvantages concerning porosity, morphology and homogeneity of the such manufactured granular materials. It has shown that the attempt to optimize one of these characteristics can be to the disadvantage of another characteristic as described in detail in the following. The best with respect to all mentioned characteristics of the granular material results from the method according to the invention.

On the one hand, with a stirring motion set according to the invention the dispersion is kept long enough in a homogeneous liquid phase. The homogeneous liquid phase leads to a quick disintegration of the material and temperature gradients thus, guaranteeing the homogeneous composition of the dispersion and particularly a homogeneous moisture distribution. When keeping up the homogeneous liquid phase there is continuous abstraction of liquid from the dispersion. It is assumed that the granular material develops from agglomerates which have formed slowly in the liquid phase during the granulation process. Liquid abstraction leads to continuous densification of the agglomerates being formed.

On the other hand, with a high enough moisture content the dispersion transforms from its state of homogeneous liquid phase into its state as a granular mass, because a high liquid content increases the plasticity of the dispersion and reduces the mechanical impact of the stirring tool on the stirred mass. The agglomerates being formed could be altered or damaged by heavy shock load and shear strain, which would result in a granular material of unregular morphology. With the method according to the invention this is avoided and simultaneously, the regular generation of agglomerates is promoted by setting the stirring motion at such a low value that the solids content amounts to a maximum of 80 weight percent. The stirring motion to be set to achieve this is relatively low, so that it has only a very slight impact on the stirred material. Without any influence exerted by the stirring tool agglomerates can essentially form regularly from the homogeneous liquid phase thus, achieving a uniform, spherical morphology of the granular particles developed.

The regular morphology and the homogeneous density of the individual granular particles in return lead to the individual particles showing similar thermal characteristics, for example, a similar sintering temperature or thermal conductivity. This not only facilitates sintering of the individual particles but it also facilitates their melting into a homogenous, bubble-free quartz glass body. Essentially, spherical particles are meant to be particles in the form of a ball.

With a granular mass with a solids content of more than 80 weight percent there is the danger of making the formation of agglomerates in the homogeneous liquid phase more difficult, from which the granules finally generate due to the then necessarily higher stirring motion and due to the then lower plasticity of the dispersion and, in addition, there is the danger of damaging the agglomerates being formed. However, with a solids content of less than 65 weight percent there is the danger that the resulting granulation shows low specific density and inhomogeneous composition and density distribution.

Usually, the stirring motion is carried out with a stirring tool. The stirring motion to be set for keeping the mentioned residual moisture essentially derives from the stirring speed of the stirring tool. A suitable stirring speed depends on the type of stirring tool used and can be determined by means of only a few tests. By continuous stirring the dispersion is homogenized. This "continuous stirring" can also be an interrupted stirring process. With the method according to the invention addition of a bonding agent is not necessary.

Within the context of the invention colloidal dispersions are meant to be dispersions in which the silicic acid is manufactured by means of hydrolysis of silicon compounds in the gas phase or liquid phase or by means of the so-called sol-gel-method by hydrolysis of organic silicon compounds.

It has proven especially advantageous to adjust the stirring motion such that the granular mass forms at a solids content in the range of 75 weight percent to 80 weight percent. Such, transition from the homogeneous liquid phase into the granular mass occurs at a moisture content in the range of 20 weight percent to 25 weight percent.

Particularly good results are achieved if a stirring tank with a vertically inclined middle axis and a stirring tool rotating in it is used. Due to the inclination of the stirring tank the liquid dispersion accumulates at the lowest point from where it is continuously led to the stirring tool. Thus, the dispersion is continuously kept in motion; dead angles are avoided to a large extent. Keeping up of the homogeneous liquid phase is guaranteed by means of the regular input of energy into the dispersion, whereby the careful stirring motion has an as low as possible impact on the formation of agglomerates in the dispersion.

Advantageously, the stirring tank rotates in opposite direction of the stirring tool. Thus, an especially intensive and at the same time careful and homogeneous mixing of the dispersion is achieved.

A method is preferred where a stirring tool with a drive is used, and an electrical quantity being measured is correlative to the power of input of the drive and the drive is switched off depending on the power input. As a formular for the setting of the stirring motion the power input of the drive for the stirring tool can be referred to as the transition of the homogeneous, liquid dispersion into a granular mass goes along with a significant increase in the stirring resistance and thus, with a significant increase of the power input of the stirring tool. With unchanged stirring motions, the increase in the stirring resistance in structurally viscous dispersions is due to the increase in the solids content of the dispersion. With a gradual increase of the solids content of the dispersion a significant increase in the stirring resistance can be noted at a determined "limit solids content", at which granular mass forms from the homogeneous, liquid dispersion. Due to thixotropy the value of the "limit solids content" in return depends on the intensity of the stirring motion. In accordance with the invention the stirring motion is to be set such that the increase in the stirring resistance occurs at a solids content in the range of 65 weight percent to 80 weight percent, preferably at 75 weight percent to 80 weight percent.

After switching off the drive, the stirring tool does no longer have an essential mechanical impact on the dispersion and/or the granules forming from it. Damage to the granular material and negative effects on the desired regular morphology are thus avoided.

In this respect it has proved to be especially suitable to switch off the drive after the power input has at least doubled within a pre-determined period of time. A period of time could, for example, be 30 minutes.

A method is particularly preferred in which a dope additive is added to the dispersion. With the method according to the invention an especially homogeneous distribution of dope additives in the homogeneous liquid phase and thus in the granular material is possible.

A dispersion the pH value of which is set between 1 and 5 shows an especially advantageous flow behavior. The flow behavior is affected such that the transition from the liquid phase into the granular mass with the above mentioned solids content is facilitated.

Advantageously, a pre-heated, dry gas is fed into the stirring tank. The pre-heated dry gas serves the gradual abstraction of moisture from the dispersion. Here, a dry gas is meant to be a gas the relative moisture of which at the temperature set within the stirring tank is below the condensation point. By means of turning the dispersion in the stirring tank over and over again the dry gas steam is continuously exposed to new surfaces.

A preferred stirring tool for stirring the dispersion is a pin-type stirring tool. That means a stirring tool having several cylindrical or wedge shaped pins, extending along the rotational axis of the stirring tool. During stirring the pins describe circles, surrounding coaxially the rotational axis. Using such a stirring tool facilitates the maintaining of the homogeneous liquid phase.

The granular mass manufactured according to the invention is suitable as a starting material for pulling quartz glass bodies from a crucible (crucible pulling method.) It has been found out that for this method the granular material does not need to be densely sintered or completely vitrified; sintering of the granular material at a temperature of below 1200° C. is sufficient. This effect can be attributed to the uniform morphology of the granular material which facilitates sintering or melting of the granular particles. Therefore, the cost intensive high-temperature method necessary for dense sintering or complete vitrification can be avoided. This special ability for application can be due to the high density and uniform morphology of the granular material manufactured according to the invention.

To the same extent the granular material manufactured according to the invention can be used as a starting material for the manufacture of quartz glass crucibles, for example, with application of the plasma-spraying method. The method of plasma spraying into a rotating mould is, for example, described in DE-A1 29 28 089. For this application the granular material does not need to be densely sintered or completely vitrified; sintering of the granular material at a temperature of below 1200° C. is sufficient.

The invention is described in detail in the following embodiment and patent drawing. The drawings are showing in FIG. 1 schematically an intensive mixer used in the method according to the invention in a three dimensional view, FIG. 2 schematically a pin-type stirring tool as used in the intensive mixer shown in FIG. 1, and FIG. 3 a measuring curve of the time course of the power input of an electrical drive of a stirrer during the granulation process according to the invention.

For granulation an intensive mixer, type R, manufactured by the machine factory Gustav Eirich, is used as it is shown in FIG. 1. The intensive mixer comprises a stirring chamber 1 that has a synthetic lining and rotates around its middle axis 3. Designation number 2 shows the rotating direction. In relation to the horizontal level, the middle axis 3 has a rake of 30°. A rotating pin type stirring tool 6 protrudes into the stirring chamber 1. Essentially, the stirring tool 6 comprises a circular disk 7 which is knobbed on the lower side by several pins 5 that faces the stirring chamber bottom 9. The stirring tool 6 rotates in opposite direction 8 of the stirring chamber 1 and is arranged asymmetrically in relation to its middle axis 3. The stirring chamber 1 surfaces facing the stirred mass and the stirring tool 6 consist either of synthetic material or of quartz glass.

A colloidal dispersion of pyrogenetically manufactured $SiO_2$ dust of high purity and deionized water is filled into the stirring chamber. The initial moisture of the dispersion is 45 weight percent and, thus, its initial solids content is 55 weight percent. Hydrochloric acid is added to the dispersion in order to set a pH value of approximately 2. The dispersion contains no further bonding agents.

Figure 2:
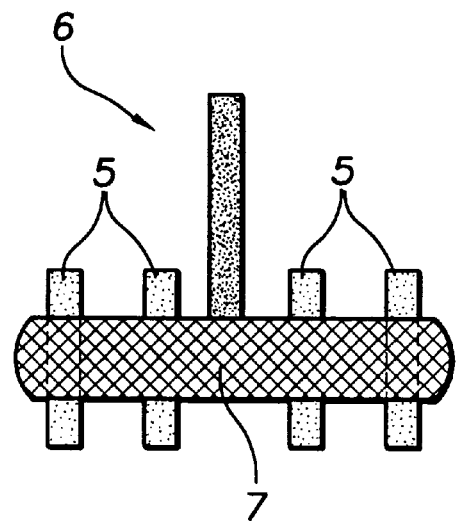

FIG. 2 shows the pin-type stirring tool 6 in more detail. It comprises several quartz glass pins 5, which are symmetrically arranged around the outer periphery of a flat circular disk 7, made of polyethylene. The pins 5 are fixed in the disk 7 in such a way that they project vertically from the flat surfaces of the disk 7, whereby the longitudinal axis of each pin 5 is parallel to the shaft of the stirring tool 6.

In the following an example for the method according to the invention is explained in detail:

After a homogenizing phase of approximately half an hour, during which the stirring tool rotates at a rotational speed of 320 RPM and the stirring chamber rotates in opposite direction at a rotational speed of 10 RPM, the actual granulation process starts. For this purpose, the rotational speed of the stirring tool is reduced to a relatively low value of 30 RPM, and the rotational speed and direction of the stirring chamber is maintained at 10 RPM. By means of the such set stirring motion a homogeneous liquid phase is formed in which material exchange processes take place rapidly. For gradual and gentle desiccation of the dispersion a dry nitrogen stream heated up to 100° C. is continuously fed into the stirring chamber and sucked off. Due to the set rotational speeds of the stirring tool and stirring chamber keeping up of the homogeneous liquid phase up to a degree of moisture within the range of 22 weight percent to 25 weight percent is possible.

During granulation the power input of the stirring tool drive is checked in order to recognize the end of the granulation process. The drive is turned off as soon as a doubling of the power input within a period of 30 minutes has been measured. This is always the case when the dispersion becomes a granular mass. The granular mass has a residual moisture within the range of 22 weight percent to 25 weight percent. With a more rapid rotational speed of the stirring tool and chamber a granular material with less residual moisture is obtained, and with a lower rotational speed a granular material with a higher residual moisture is obtained.

Figure 3:
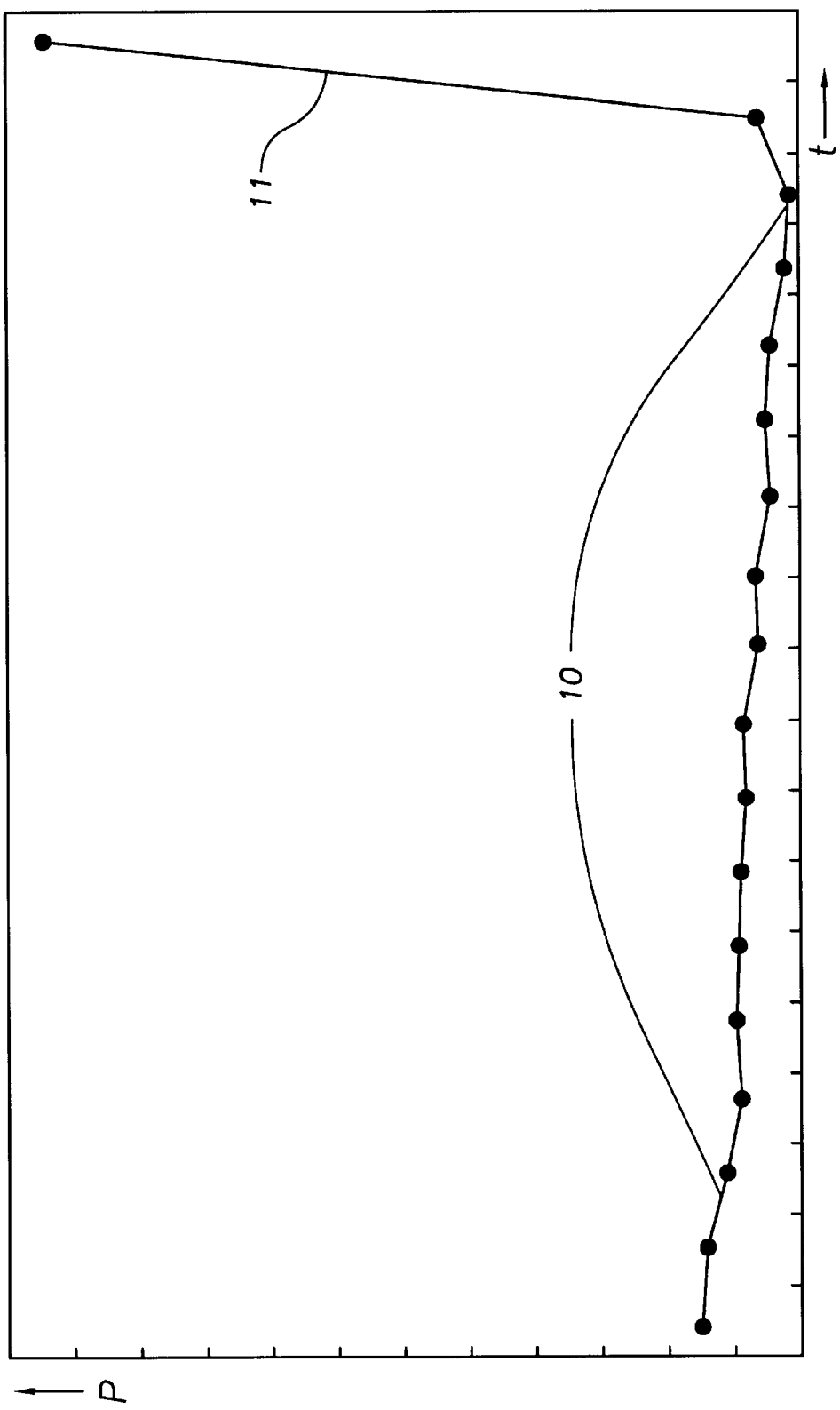

The time course of the power input of the stirring tool drive during the granulation method is shown in FIG. 3. On the ordinate the power input measured "P" in relative units and on the abscissa the time "t" are plotted. The results measured are shown as black points. It can be seen that, for the time being, the power input of the drive remains constant at a low level (range 10) and is even slightly reduced in the course of time, and that it increases significantly only towards the end of the granulation process (range 11). The increase takes place within a few minutes only and goes along with the transition of the homogeneous liquid phase into the granular mass.

The granular material manufactured according to the invention consists of granules of a mean size of up to approximately 1 mm. The granules are almost non-porous, they show high-purity, a uniform, essentially spherical granular morphology, a high bulk density of approximately 1 g/cm$^3$ and a tight pore size distribution. The B.E.T. surface area of the granular material is within the range of 40 m$^2$/g to 60 m$^2$/g. Due to these characteristics of the granular material manufactured according to the invention and particularly due to its uniform granular morphology the individual particles show an almost similar sintering and melting behavior. This facilitates sintering or vitrification of the particles and melting of the granular material for the manufacture of quartz glass or goods made of quartz products.

Subsequently, the granular mass is taken out of the stirring chamber and—if need be—sieved. The granular material is continuously pre-dessicated in a rotary kiln at temperatures within the range of 80° C. to 200° C.

Depending on the purpose of application of the granular material it is heated up to temperatures within the range of 200° C. to 1200° C. for further desiccation and purification. For this, a rotary kiln is used which is suitable for post-purification of the granular material, as well. For purification of the granular material a suitable chlorine-containing purification gas (usually a HCl/chlorine compound) runs through the rotary kiln. Purification is especially effective if the gas runs evenly around all granular particles and if the purification gas volume is considerably higher than the pore volume of the granular material. The movement of the granular material within the rotary kiln is adjusted to be as even and quick as possible. The individual purification phases can be repeated to achieve a high-purity granular material. With the granular material manufactured according to the invention only a slight shrinking and reduction of the B.E.T. surface as a consequence of the high-temperature treatments are being noticed.

Possible abrasion caused by plastic-coated surfaces is eliminated in a calcination step during which the granular mass is heated up to temperatures within the range of 1000° C. to 1200° C. in an oxygen-containing atmosphere.

Subsequently, the granular material is sintered. The temperature and time of the sintering processes depend on the purpose of application of the granular material. In order to vitrify the granular material completely it is treated in a chamber kiln at sinter temperatures of around 1350° C. to 1450° C. Granular material which is completely vitrified is , for example, suitable for the manufacture of optical quartz glass components, such as lenses or preforms for beam waveguides.

For some applications a granular material which has been sintered less densely is sufficient. For example, for the manufacture of opaque quartz glass parts which are used in the semi-conductor industry for catalyst carriers or as filling materials in the electronics industry.

When applied as a starting material for the manufacture of quartz glass bodies by means of pulling out of a melting crucible sinter temperatures of around 1150° C. have proven to be sufficient. In this method, the not densely sintered granular material is put into the melting crucible and melted in it, a completely transparent quartz glass product, for example, a lamp tube resulting from it. This is not a matter of course; as with such methods when applying the known granular materials the resulting glass products consist of foam glass. To the same extent, a granular material manufactured according to the invention and sintered at temperatures of around 1150° C. is suitable as a starting material for the manufacture of quartz glass crucibles.

We claim:

1. A method for the manufacture of $SiO_2$ granular material, said method comprising dispersing silicic acid in a liquid to form a dispersion, stirring of the dispersion in a stirring tank with formation of a homogeneous liquid phase, and gradual abstraction of moisture from the dispersion to form a granular mass, and drying of the granular mass and sintering, the homogeneous liquid phase being maintained by stirring at a set stirring speed until the granular mass develops, where the solids content of the dispersion is within the range of 65 weight percent to 80 weight percent.

2. A method according to claim 1, wherein the stirring is adjusted such that the granular mass forms at a solids content of the dispersion within the range of 75 weight percent to 80 weight percent.

3. A method according to claim 1 wherein the stirring is accomplished by rotating the stirring tank about a generally vertical axis and a rotating stirring tool is supported therein for stirring the liquid phase.

4. A method according to claim 3, wherein the stirring tank rotates in a direction opposite to the rotation of the stirring tool.

5. A method according to claim 1, and further comprising providing a stirring tool with a drive supplying a power input to a stirring rod for stirring the liquid phase, measuring an electrical quantity related to the power input supplied by the drive and switching the drive off responsive to a determination based on the power input.

6. A method according to claim 5, wherein the drive is switched off if the power input has at least doubled within a pre-determined period of time.

7. A method according to claim 6, wherein a dope additive is added to the dispersion.

8. A method according to claim 1, wherein the dispersion is maintained at a pH value between 1 and 5.

9. A method according to claim 1, wherein a preheated, dry gas is fed into the stirring tank.

10. A method according to claim 1, wherein the stirring of the dispersion is accomplished with a pin-type stirring tool.

* * * * *